A. BOREUX.
PHOTOGRAPHIC POCKET CAMERA.
APPLICATION FILED JAN. 27, 1909.

966,886.

Patented Aug. 9, 1910.
2 SHEETS—SHEET 1.

Witnesses:

Inventor:
Armand Boreux

UNITED STATES PATENT OFFICE.

ARMAND BOREUX, OF BASEL, SWITZERLAND.

PHOTOGRAPHIC POCKET-CAMERA.

966,886.      Specification of Letters Patent.      Patented Aug. 9, 1910.

Application filed January 27, 1909. Serial No. 474,442.

*To all whom it may concern:*

Be it known that I, ARMAND BOREUX, a citizen of Switzerland, and resident of 31 Petersgraben, Basel, Switzerland, have invented certain new and useful Improvements in Photographic Pocket-Cameras, of which the following is a specification.

My invention relates to photographic pocket cameras. A photographic apparatus of this type must necessarily be of limited size and little weight and most of the existing cameras are of a form unsuitable for pocket wear, while moreover, they have little strength and stiffness as regards their general construction so that the front or lens carrier cannot be held rigid after a time and the lens will not be permanently parallel with the sensitized surface. These defects tend to greatly restrict the usesfulness of the apparatus, prevent good or exact work being obtained with the same as well as the full utilization of lenses with relatively large opening as is necessary for pocket cameras.

The aforesaid defects are avoided in the apparatus constructed according to this invention by forming the edges of the four sides of the body of the cameras in the manner of an ogee, or nearly so, with rounded corners, which will facilitate the ready handling of the apparatus and fulfil the conditions required of a pocket camera. Further, the improved construction provides for the required solidity and rigidity of the entire structure and also for the firm retention of the lens-carrier in its operative position as well as the permanently insured parallelism of the lens to the sensitized surface, by definitely engaging the lens-carrier in slotted guides fixed to a divided hinged cover for the camera. In this manner it will not be possible for the said parts to become loose or displaced.

Figure 1:
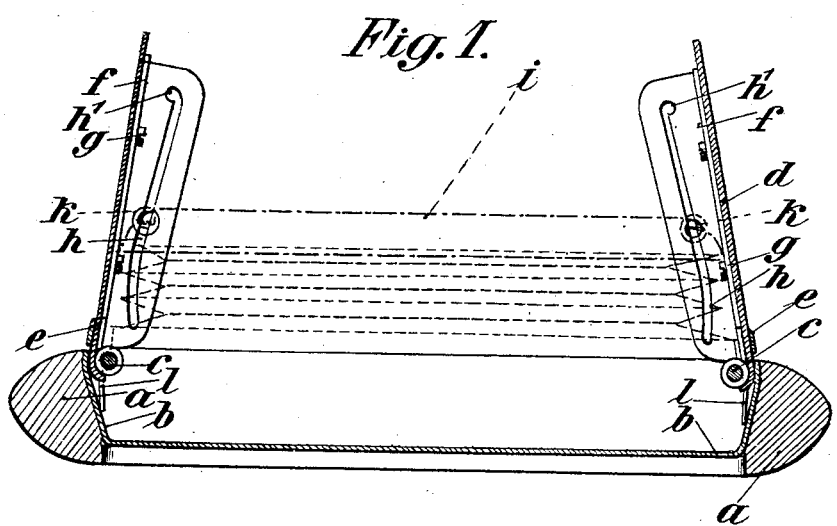
Figure 2:
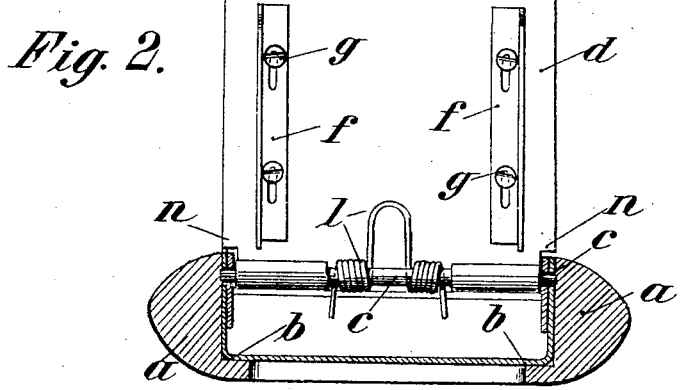
Figure 3:
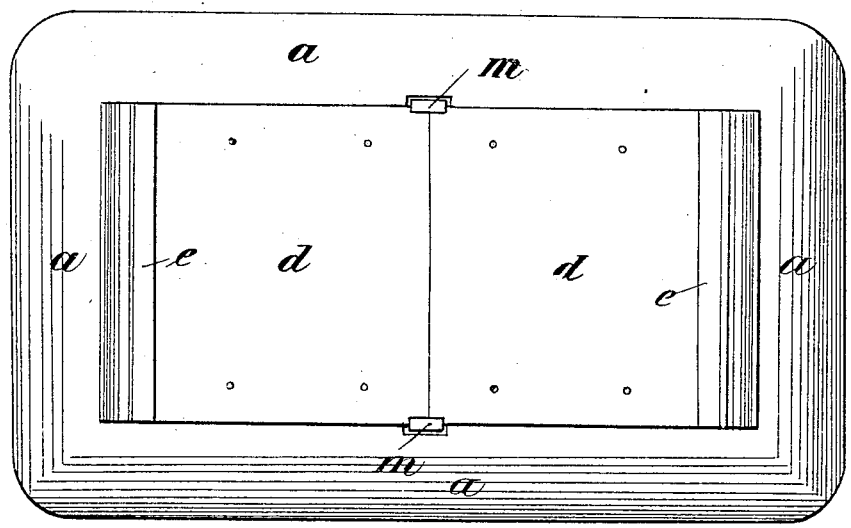

The camera is shown in the accompanying drawings, in which:

Figure 1 is a longitudinal section of the partially opened apparatus. Fig. 2 is a cross-section corresponding to Fig. 1. Fig. 3 is a plan of the camera in its closed condition.

The casing of frame $a$ of the camera is reduced at all its four edges to an ogival or nearly ogival shape or edges as shown in Figs. 1 and 2. The four corners of the casing $a$ are strongly rounded as shown in Fig. 3. The casing can be made of any appropriate material and may be solid or hollow. With a hollow casing the interior can be used as a container for film-rolls or for a roller-shutter or for both. The casing may also be so formed as to receive a pack of films or contain a change-box or the like. In the casing $a$ is placed the box $b$ of the apparatus proper, and at each inner end thereof there is mounted a shaft $c$ for a divided hinged lid $d$. The two portions or wings of the lid $d$ can be turned down for completely closing the box as indicated at Fig. 3, while on being opened the rear of each wing or lid portion comes against the inner edge of the box and an external bar $e$ rests on the top of the said edge, while two shoulders $n$ at the sides of each lid will be seated on the top of the casing. At the inner side of each lid $d$ are fixed two parallel angle rails $f$ which can be adjusted by means of the screws $g$. The part of the rail standing at right angles from the lid, is formed with a longitudinal slot $h$ with an enlargement $h^1$ at the outer end. The slotted rail $f$ may be fastened in any other convenient maner. In the four corners of the lens-carrier $i$ are fixed screws or pins $k$ which engage in the slots $h$ and so definitely guide the lens-carrier $i$ between the four rails $f$. The distance of the pins $k$ at the longitudinal sides of the lens-carrier is slightly greater than the distance between the upper ends of the opposite slots $h$ when the lids are fully open. By forcing the lens carrier outward in the slots, the lids which rest with their bars $e$ on the casing, will act as springs, and when the lens carrier is pushed up into the enlargement $h^1$ the pins $k$ will be forced to the rear of such enlargement and firmly retained by the springiness of the lids. When the lids are turned down they close the camera and protect the lens from injury.

Both shafts $c$ are furnished with springs $l$ adapted to press against the lids and the inner portions of the box with constant tendency to open the lids which are locked by the ordinary spring catches or bolts $m$. After releasing the spring catches the lids will open sufficiently to enable the lens carrier to be readily withdrawn and to bring it into its operative position.

What I claim as my invention and desire to secure by Letters Patent is:—

1. In a photographic pocket camera in combination, a casing having ogival edges, a lens carrier movable in the said casing, guide pins fixed to the said lens carrier, a divided cover hinged to said casing, guide rails adjustably fixed to the said divided cover, slots in the said guide rails and adapted to receive the said guide pins, a lateral enlargement at the outer end of each of the said slots and also adapted to receive the said guide pins and to secure the said lens carrier in its operative position, substantially as and for the purpose set forth.

2. In a photographic pocket camera in combination, a casing having ogival edges, a lens carrier movable in the said casing, guide pins fixed to the said lens carrier, a divided cover hinged to said casing, springs adapted to open the said divided cover, guide rails adjustably fixed at the inner side of the said divided cover, slots in the said guide rails and adapted to receive the said guide pins, a lateral enlargement at the outer end of each of the said slots and also adapted to receive the said guide pins and to secure the said lens carrier in its operative position, substantially as and for the purpose set forth.

In testimony whereof I have hereunto signed my name this ninth day of January 1909, in the presence of two subscribing witnesses.

ARMAND BOREUX.

Witnesses:
GEORGE GIFFORD,
ARNOLD T. ZUBER.